United States Patent [19]

Malkemus et al.

[11] Patent Number: 5,619,692

[45] Date of Patent: Apr. 8, 1997

[54] SEMANTIC OPTIMIZATION OF QUERY ORDER REQUIREMENTS USING ORDER DETECTION BY NORMALIZATION IN A QUERY COMPILER SYSTEM

[75] Inventors: Timothy R. Malkemus, Round Rock, Tex.; Eugene J. Shekita; David E. Simmen, both of San Jose, Calif.

[73] Assignee: International Business Machines Corporation, Armonk, N.Y.

[21] Appl. No.: 394,532

[22] Filed: Feb. 17, 1995

[51] Int. Cl.$^6$ .................................................. G06F 17/30
[52] U.S. Cl. .................................................. 395/602
[58] Field of Search .................................. 395/600, 650, 395/700

[56] References Cited

U.S. PATENT DOCUMENTS

| | | | |
|---|---|---|---|
| 5,241,648 | 8/1993 | Cheng et al. | 395/600 |
| 5,276,870 | 1/1994 | Shan et al. | 395/600 |
| 5,301,317 | 4/1994 | Lohman et al. | 395/600 |
| 5,345,585 | 9/1994 | Iyer et al. | 395/600 |
| 5,367,675 | 11/1994 | Cheng et al. | 395/600 |
| 5,369,761 | 11/1994 | Conley et al. | 395/600 |
| 5,412,804 | 5/1995 | Krishna | 395/600 |
| 5,546,570 | 8/1996 | McPherson, Jr. et al. | 395/600 |
| 5,546,576 | 8/1996 | Cochrane et al. | 395/600 |
| 5,548,755 | 8/1996 | Leung et al. | 395/600 |

OTHER PUBLICATIONS

C. J. Date, *An Introduction to Database Systems*, vol. 1, 6th Ed., Addison–Wesley Publishing Co., pp. 243–244, 361–392, No date.
G. N. Paulley et al., "Exploiting Uniqueness in Query Optimization", *CASCON*, vol. II, pp. 804–822, Oct. 1993.
G. M. Lohmn, "Grammar–like Functional Rules for Representing Query Optimization Alternatives", *ACM SIGMOD International Conference on Management of Data*, 1988, pp. 18–27.

ISO–ANSI, "ISO–ANSI Working Draft: Database Language SQL2 and SQL3", 1993, pp. 545–547.
J. R. Boykin et al., "Order Class Detection", *IBM Technical Disclosure Bulletin*, vol. 32, No. 5A, Oct. 1989, pp. 283–285.
L. W. Youngren, "Dynamic Ordering of Joined Rows using Fields from Multiple Tables", vol. 36, No. 11, Nov. 1993, pp. 363–366.
"A Similarity Graph–Based Approach To Declustering Problems And Its Application Towards Parallelizing Grid Files," Duen–Ren Liu, Shashi Shekhar, 6–10 Mar. 1995.
"HUH . . . VH Multi–Layer Channel Routing" Jeesoo Lee, Yokun Cho, Jan. 1991.

*Primary Examiner*—Thomas G. Black
*Assistant Examiner*—Ruay Lian Ho
*Attorney, Agent, or Firm*—Baker, Maxham, Jester & Meador

[57] ABSTRACT

A procedure for detecting a reordering requirement in a directed record stream during query execution in a relational database processing system. The query compiler component of a relational database processing system includes procedures for building query execution plans (QEPs) for evaluation preparatory to selecting an optimal plan for execution. These plans are constructed from the bottom up using an internal graphical representation for the user query that has a number of relation nodes interconnected by directed record streams (data flows). A relational operation within each node imposes an "order requirement" on the outflow stream represented by an order requirement vector $O_R$. The records within each directed record stream have an "order property" represented by an order property vector $O_P$. Order detection occurs when these two vectors are compared to determine whether the order property satisfies the order requirement. Order detection by normalization (ODN) according to this invention first normalizes the two order specification vectors to remove all attributes made redundant by the effects of predicates and functional dependencies. Query execution plans constructed using ODN are found to execute an order of magnitude faster than those constructed using order detection without normalization.

20 Claims, 5 Drawing Sheets

SEMANTIC OPTIMIZATION OF QUERY ORDER REQUIREMENTS USING ORDER DETECTION BY NORMALIZATION IN A QUERY COMPILER SYSTEM

BACKGROUND OF THE INVENTION

1. Field of the Invention

This invention relates generally to computer-implemented systems for optimal query execution in relational database processing systems and particularly to a system for optimizing query ordering requirements by normalization of relational order specifications to accommodate predicates and functional dependencies before order detection in a query compiler system.

2. Description of the Related Art

A relational database management system (RDBMS) is a computer-implemented database processing system that uses relational techniques for storing and retrieving data. Relational database management systems are computerized information storage and retrieval systems in which data in the form of tables (formally denominated "relations") are typically stored for use on disk drives or similar mass data stores. A "relation" includes a set of rows (formally denominated "tuples" or "records") spanning several columns (formally denominated "attributes"). Each "attribute" in a relation includes "restrictions" on the data contents thereof, which may include designation as a primary or foreign key. A "tuple" expresses a mathematical relation between its "attributes" (column elements), while a "record" does not. Reference is made to C. J. Date, An Introduction to Database Systems, 6th Edition, Addison-Wesley Publishing Company, Reading, Mass. (1994) for a general treatment of the relational database art.

A relational database processing system is structured to accept commands to store, retrieve and delete data using high-level query languages such as the Structured Query Language (SQL). As used herein, a "query" refers to a set of user commands for retrieving data from a stored database. The query language requires the return of a particular data set (relation) in response to a particular query but the method of query execution employed by the database management system is not specified by the query. The method of query execution is herein denominated the "Query Execution Plan (QEP)" and there are typically many different useful QEPs for any particular user query, each of which returns the required data set. For large databases, the execution plan selected to execute a query must provide the required data return at a reasonable cost in time and hardware resources. Most RDBPSs include a query compiler to translate queries into a QEP, which includes a query optimizer to select an efficiently executable QEP.

Among many well-known SQL commands, a SQL query may include the ORDER BY clause. For instance, the following SQL query example returns a list of movie titles, in alphabetical order, from a relation keyed to movie stars:

SELECT DISTINCT MOVIE_TITLE
FROM MOVIE_STARS
ORDER BY MOVIE_TITLE ASC;

In this example, only one attribute or column is used for ordering. ASC requires an ascending order, as opposed to DESC for descending order. This query imposes an "order requirement" that must be satisfied by the query compiler when it generates a QEP. Moreover, the query compiler itself may generate internal order requirements arising from combinations of other SQL operations. For example, the internal procedures used to satisfy GROUP BY and DISTINCT clauses generally require an input record stream with an "order property". The sort-merge join operation is known in the art to require an "order property" in each of its record stream inputs. Also, where VIEW specifications are used, an order requirement may arise for the intermediate results of a query as well as for the final query data return. As used herein, the terms "order property" and "order requirement" refer to two order specifications imposed on a group of records in a relation. Such order specifications list one or more "attributes" (columns) within each record on which the records are ordered.

A typical RDBPS puts records in order by either sorting the records on their "order requirement" attributes or, when possible, by scanning an existing index that already provides the required ordering. Sorting is a costly operation that is avoided when possible, so the typical query compiler first searches for an existing index that satisfies the order requirement. As used herein, an "index" is a user-defined relation that maintains a certain order of records. Each relation may be associated with any number of indexes or with no index. When no index can be found, sorting is unavoidable and the query compiler then attempts to minimize the number of sort "attributes" to optimize execution plan efficiency. Thus, as it generates an execution plan, a query compiler must detect whether a sort can be avoided and, if unavoidable, how many attributes in the "sort requirement" may be eliminated during actual sorting. This process is herein denominated "order detection". The following example illustrates the "order detection" problem known in the art:

SELECT SALARY, NAME
FROM EMP
WHERE SALARY=50,000
AND DEPTNO=:HV
ORDER BY 1,2;

In this SQL example, each execution plan must produce a stream of records in the order specified by the ORDER BY clause. Consequently, the query compiler must satisfy the order requirement (SALARY, NAME), with SALARY being the major ordering attribute. If an ascending index exists on attributes (SALARY, NAME), then an index scan produces the required "order property" without sorting. Alternatively, an unordered table scan followed by a sorting process may be employed to produce the required "order property" in the final relation. Typically, a query compiler considers both plans and chooses the less expensive to execute.

In the above example, if an ascending index also exists on the NAME attribute, then such index could also be used to produce the requisite order property without sorting. No sorting is actually then required because the SALARY attribute is bound to a constant by the predicate SALARY= 50,000. Accordingly, the SALARY attribute does not affect the order property because all qualifying records have the same SALARY attribute (the same value in the SALARY column). Similarly, where an unordered table scan and sort are used, the sort need only be on the NAME attribute. Finally, if an index is found for (DEPTNO, NAME), it also satisfies the order requirement without sorting because, like the SALARY attribute, the DEPTNO attribute is bound to a constant (in this case to a host variable value).

The above-described example shows how the order detection process could improve execution efficiency if it could be aware of which relation attributes are "bound" to constants by way of predicates during execution plan generation. Order detection could also improve efficiency if it could be aware of keys and any functional dependencies arising therefrom, as illustrated by the following example:

```
SELECT E.EMPNO, E.NAME, D.DEPTNO
FROM EMP E, DEPT D
WHERE E.DEPTNO=D.DEPTNO
ORDER BY 1,2,3;
```

In this SQL query example, the query compiler must satisfy the order requirement vector (E.EMPNO, E.NAME, D.DEPTNO), which includes the first, second and third attributes in each record. If the EMPNO attribute is a key of the EMP relation, then sorting on EMPNO alone is sufficient to meet this order requirement. Alternatively, using an index ordered on EMPNO is sufficient without sorting. The skilled database practitioner can appreciate the reason for this sufficiency, which arises because the primary key EMPNO creates a "functional dependency" between the EMPNO attribute and all other attributes within the relation. This functional dependency combined with the predicate E.DEPTNO=D. DEPTNO means that E.EMPNO "functionally determines" both E.NAME and D.DEPTNO, which in turn implies that sorting on E.EMPNO is sufficient to create the three-attribute order property specified by the above example. Until now, the sort detection processes in the art have not been aware of these relationships.

Succinctly, a "functional dependency" herein denotes a relationship between two attributes where "A functionally determines B" when every record in a relation that has a particular value for attribute A has an unchanging value for attribute B. In the art, this functional dependency is denoted by the standard notation $A \rightarrow B$. An attribute B is "functionally dependent" on a set of attributes or columns $\overline{C}=\{C_1, C_2, \ldots, C_n\}$ if, for any two records with the same values for the columns $\overline{C}$, the value of column B is the same. Equivalently, it is said B is functionally determined by $\overline{C}$, which is denoted as $\overline{C} \rightarrow B$. As is known in the art, key attributes are actually a special case of functional dependency referred to as a "key dependency". A key dependency functionally determines all columns of the record stream for which it is a key. Any remaining dependencies are denoted "non-key dependencies". Functional dependencies usually arise from keys, whether primary or foreign. Joins and other relational operations can transform a key dependency into a non-key dependency. Relational operations such as DISTINCT and GROUP BY can add key dependencies to derived relations. For the purposes of this disclosure, it is assumed that means are available to determine whether $\overline{C} \rightarrow B$ is true.

Reference is made to Hugh Darwen et al. (RELATIONAL DATABASE WRITINGS 1989–1991, C. J. Date with Hugh Darwen, Chapter 10: The Role of Functional Dependencies in Query Decomposition for a description of the semantic concept of functional dependencies. Darwen et al. suggest algorithms for deriving functional dependencies from base relations and for propagating functional dependencies across derived relations. Darwen et al. also consider a variety of uses for functional dependencies by a RDBMS query compiler, but they neither consider nor suggest how to accommodate functional dependencies during order detection.

Figure 2:
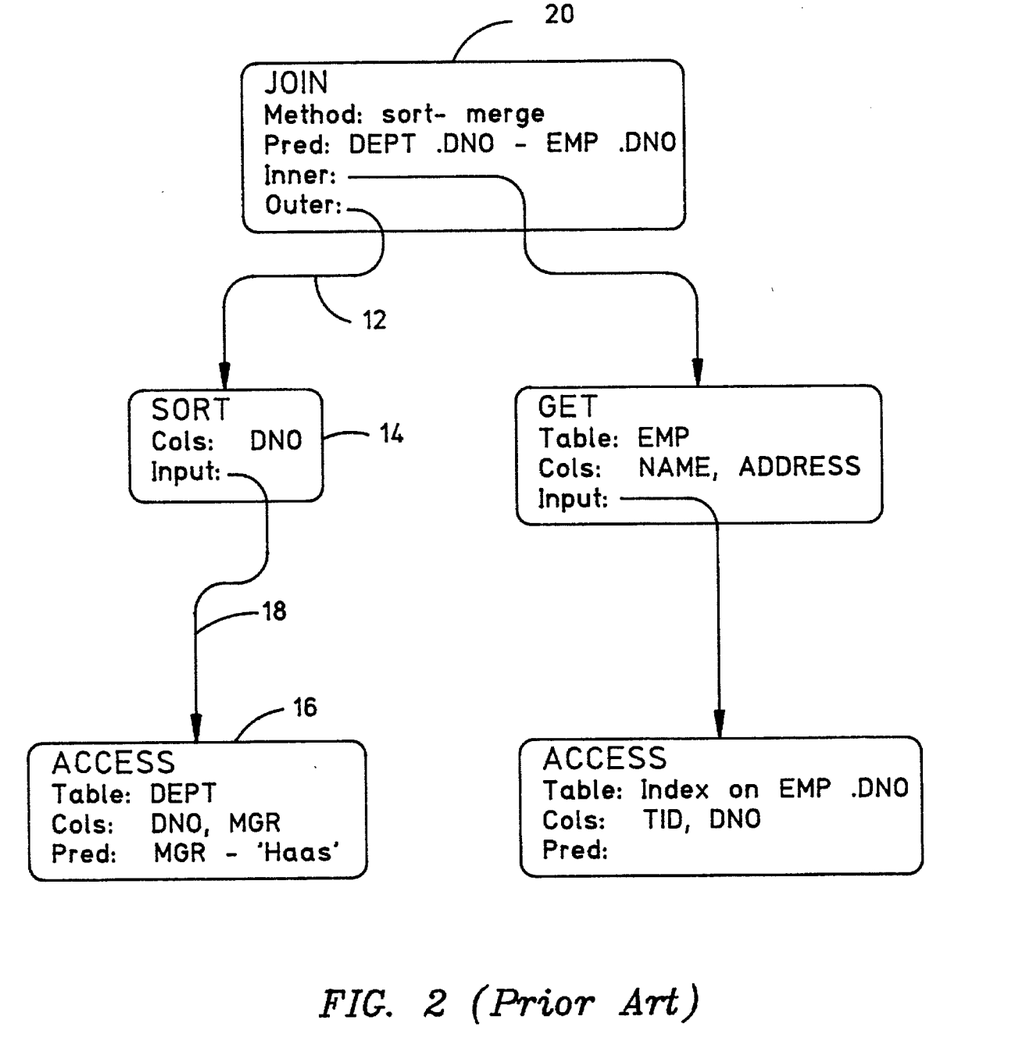
FIG. 2 shows a Query Execution Plan (QEP) diagram from the prior art for an exemplary SQL query.

As is known in the art, a query compiler for a relational database processing system translates a high-level query into a query execution plan (QEP), which is then interpreted by a database engine at run time. Conceptually, a QEP is viewed in the art as a data flow graph of operators, whese each node in the graph corresponds to a set of output records arising from a relational operation such as "join" or a lower-level operation such as "sort". FIG. 2 shows a query execution plan (QEP) for the following exemplary SQL qudry.

```
SELECT NAME, ADDRESS
FROM EMP E, DEPT D
WHERE E.DNO=D.DNO AND MGR='Haas'
```

Note that the QEP in FIG. 2 is a directed graph of LOw LEvel Plan OPerators (LOLEPOPs), herein formally denominated "relation nodes". Note that the data-flow arcs exemplified by arc 12 point toward the source of the record stream and not in the direction of data-flow. For instance, the SORT node 14, representing a relational SORT operation, receives a record stream from the ACCESS node 16 along the directed data-flow arc 18 and produces a directed record stream along arc 12 to the JOIN node 20. For the purposes of this disclosure, notice that each relation node in FIG. 2 is coupled to one or more other relation nodes by data-flow arcs (herein formally denominated "directed record streams") exemplified by directed record streams 12 and 18. With the notation used herein, each relation node $N_i$ consumes one or more incoming record streams $\{R_{ji}\}$ and produces at least one output record stream $R_{ik}$ that is directed to one or more other nodes (k and j may each assume more than one value). In the example shown in FIG. 2, each relation node produces only one output record stream routed as an input record stream to one other relation node.

Reference is made to Guy M. Lohman ("Grammar-like Functional Rules for Representing Query Optimization Alternatives", A CM SIGMOD International Conference on Management of Data, 1988, pp. 18–27) for a detailed discussion of the "properties" associated with relation nodes or operators in a QEP. Every relation node is associated with a set of properties that summarizes the work accomplished in the relation thus far in the dataflow path from bottom (base-tables) to top (TOP node). Lohman et al. discuss these properties in terms of the query execution cost model and notes that all properties are handled uniformly as elements of a "property vector", which is easily extended to include more properties. The "property vector" includes the "attributes property", herein denominating the columns of a record stream, which may include columns from base-relations and those derived from expressions. The "attributes property" is used to track the record stream columns.

Examples of properties include the set of attributes that make up each record or tuple in the stream, represented by the head of each node. Other examples include the set of predicates that are applied to the incoming records within the node body, the specification of which attributes form unique keys and/or functional dependencies (if any), the order specification for the record stream, and the like. Each relational operator node in a QEP determines the properties of its output record stream.

The properties of an output record stream from a node are a function of the node input streams and the internal operations applied within the node. For example, a sort operation passes on all of the properties of its input stream unchanged except for the order property. A query compiler typically constructs a QEP from the bottom up, operator by operator, computing and updating properties as it proceeds. Depending on the implementation, some properties may be stored in QEP operators (within "nodes") while others may be recomputed when needed to save space.

Each node in a QEP receives one or more directed record streams each having an "order property". By virtue of operations within the node, each node produces an output record stream according to an "order requirement". As discussed above, the ORDER BY, GROUP BY, and DISTINCT specifications create order requirements. Moreover, the query compiler may generate order requirements, depending on the alternative execution plan characteristics. An example of an execution strategy is the "sort merge join" operation, which requires certain order properties in the incoming record streams. There may be multiple order requirements imposed within any given SQL query. Both order properties and order requirements are represented by an order specification and are herein referred to generally as order specifications. As a simple example, ORDER BY $C_1$, $C_2$, $C_3$ gives rise to the order requirement vector ($C_1$, $C_2$, $C_3$). In the case of the GROUP BY and DISTINCT clauses, any permutation of the order specification suffices. For example, GROUP BY $C_1$, $C_2$ is represented by either of the order requirements ($C_1$, $C_2$) and ($C_2$, $C_1$). The order requirement of the GROUP BY operation is satisfied if either order requirement is satisfied. In some query compilers, these two order requirement vectors can be represented as a single order requirement specification. For the purposes of this disclosure and without loss of generality, it is assumed that each record stream must satisfy only a single order requirement. In the general case, many order requirements may be imposed on a single record stream, which might benefit from additional procedures to "compact" multiple order requirements into a single order specification.

As a QEP is constructed, order requirements must be satisfied. That is, for instance, when an ORDER BY operator is added to the QEP, the "order detection" procedure examines the "order property" of the vector associated with the input stream to determine whether it satisfies the "order requirement" imposed by relational operations in the local relation node. If the "order property" of the incoming record stream does not satisfy the "order requirement" imposed by the receiving relation node, then the query compiler adds a sort operator to the QEP, representing an additional operation internal to the receiving relation node. This sort operator adds substantial cost to the resulting QEP and it is a desired function of the "order detection" procedure to avoid adding sort operators wherever possible.

Initially, the properties of stored base tables and access methods are determined from the system catalogs. At first, no predicates are applied and no cost has been incurred in the query. The "order property" is unknown unless the base relation is known to store records in some order or if an index is used to access the relation in which case the order is defined by the set of attributes on which the records are ordered.

During compilation, the predicates in a SQL query are usually broken down into conjunctive normal form. This permits each conjunct to be applied as an independent predicate. When a predicate or conjunct is applied to an input record stream, each record in the resulting output record stream is imprinted with the "property" that it satisfies the predicate. Herein, the term "predicate property" denominates the property used to track all predicates that have been applied to a record stream.

The "order property" for a record stream represents the physical ordering of the stream's records. An order property is denoted by listing the attributes or columns of the order in major to minor sequence. Such representation is herein denominated an "order specification vector". For example, ($C_1$, $C_2$, $C_3$) is an "order specification vector" with $C_1$ as the most major ordering column and $C_3$ is the most minor ordering column. Column $C_2$ is in a "more major" position relative to $C_3$ and in a "more minor" position relative to $C_1$. Two records are ordered with respect to an "order requirement" vector by comparing attribute values in most major to most minor sequence until order is determined (ISO-ANSI, "ISO-ANSI Working Draft: Database Language SQL2 and SQL3; X3H2; ISO/IEC/JTC1/SC21/WG3, 1993"). A record stream can acquire an "order property" because of an index access or a sort operation while other operations may preserve the order of an input record stream. For example, a nested-loop join operation preserves the order of the outer relation.

The "functional dependency" property specifies a collection of functional dependencies that hold for the attributes of the record stream. For base relations, these are typically the key dependencies of the base relations. Operations that remove duplicates can add key dependencies as described above. Key dependencies survive joins as non-key functional dependencies. The above-cited Darwen et al. reference describes the functional dependency derivation and propagation for relational operations. For the order detection process, the "functional dependency" property permits enumeration of all functional dependencies holding for the record stream.

There is an untilled need in the art for a sort detection process that permits the query compiler to understand and exploit the effects of both predicates and functional dependencies during order detection. The failure in the art to account for these effects causes the query compiler to inject unnecessary sorts or to sort on more attributes than necessary. This in turn causes the compiler to generate suboptimal query execution plans. The desire to reduce QEP cost in large database systems motivates the need for any useful method that avoids unnecessary sort operations during execution plan generation.

Practitioners in the relational database art generally appreciate the absence of a solution to this problem. For instance, Boykin et al. ("Order Class Detection", IBM Technical Disclosure Bulletin, Vol. 32, no. 52, pp. 283–285, October, 1989) discuss the continuing need to improve order detection during query optimization. Boykin et al. propose a process for recognizing when special combined order classes can be constructed to satisfy the order requirements arising from more than one order specification in a query. An order class is a list of attributes or columns, each having the attribute "ascending", "descending", or "either". The combined order classes are used to locate indexes or to specify the sorting operation necessary to satisfy the order requirements. As used herein, the "order class" is denominated an "order specification vector", which may be an "order property vector $O_{Pi}$" or an "order requirement vector $O_{Ri}$". By combining the "order specification vectors" within a query, Boykin et al. permit the query compiler to insert a single sort to satisfy two separate ordering requirements, but do not consider the effects of functional dependencies or predicates on sort specifications.

L. W. Yongren ("Dynamic Ordering of Joined Rows using Fields from Multiple Tables", IBM Technical Disclosure Bulletin, Vol. 36, no. 11, pp. 363–366, November 1993) disclose a method for ordering joined "live" data (dynamic views) without producing a temporary result table. Yongren proposes maintaining indexes that can be updated responsive to updates to the underlying base-relations. By providing for a "composite index", Yongren is able to avoid resorting operations during the maintenance of dynamic VIEW tables, but he neither considers nor suggests methods for eliminating sort operations or index scans by exploiting functional dependencies.

Similarly, in U.S. Pat. No. 5,241,648, Cheng et al. propose a hybrid method for joining tables that relies on maintaining indexes to speed the nested join procedure. In U.S. Pat. No. 5,369,761, Conley et al. speed the table join operation by selectively "denormalizing" the base-relations to avoid joining unnecessary attributes. Neither Conley et al. nor Cheng et al. consider or suggest methods for eliminating sort operations by detecting redundancy arising from functional dependencies.

There is a need in the art for an order detection process that fully assimilates and exploits the effects of both predicates and functional dependencies to avoid sorting whenever possible. The absence in the art of any process for exploiting predicate and functional dependency effects during query order detection reduces query execution plan efficiencies. These unresolved problems and deficiencies are clearly felt in the art and are solved by this invention in the manner described below.

SUMMARY OF THE INVENTION

The process of this invention improves order detection by first reducing both the order requirement vector $O_{Ri}$ and the order property vector $O_{Pi}$ to a normalized form before comparing them during order detection. The order specification normalization process of this invention uses both predicate relationships and functional dependencies to reduce each vector to a normalized canonical form. The normalized order specifications are then compared according to a naive order detection procedure to achieve order detection. QEP cost can be reduced by orders of magnitude through the order detection by normalization (ODN) process of this invention.

It is an object of the ODN process of this invention to improve query execution plan efficiency. It is an advantage of the process of this invention that all sort procedures made redundant by predicates and functional dependencies are removed automatically from the query execution plan by the query compiler. It is a feature of the process of this invention that the ODN process can be performed at each directed record stream during the "bottom-up" construction of the query execution plans (QEPs) for the user query.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompany drawing, wherein.

DETAILED DESCRIPTION OF THE PREFERRED EMBODIMENT

The System of the Invention

Figure 1:
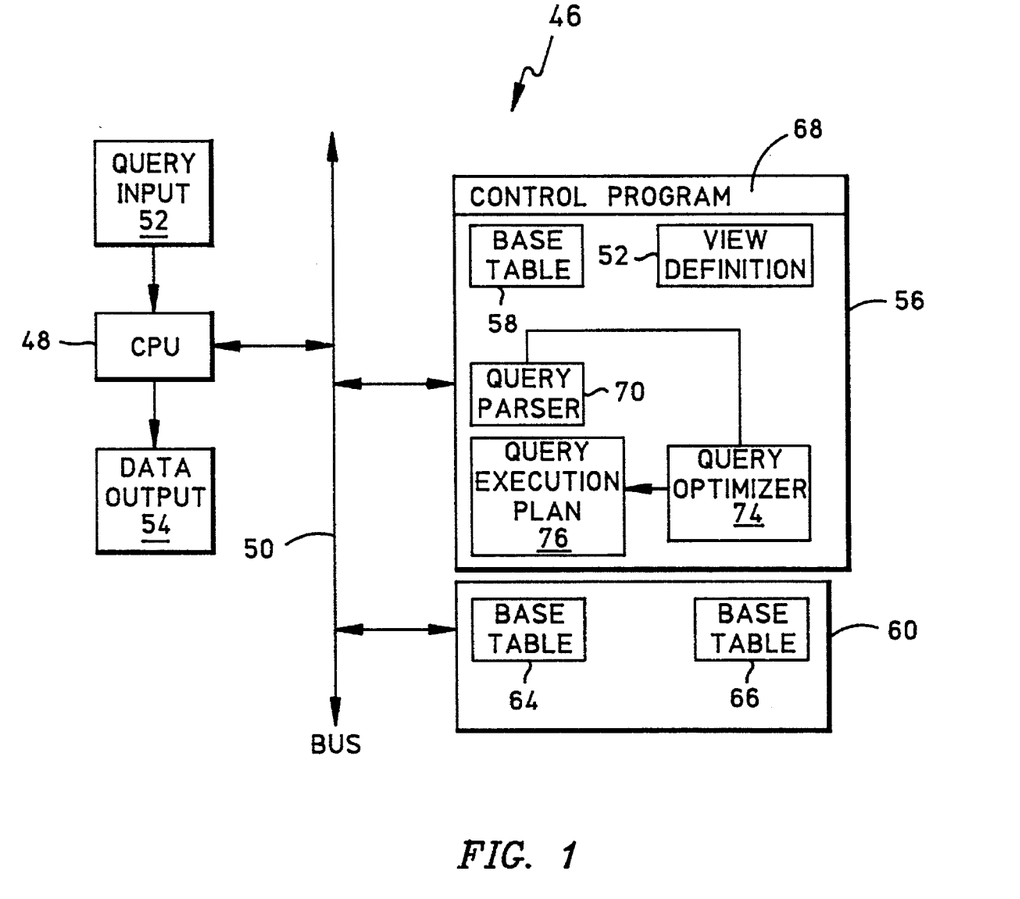
FIG. 1 is a functional block diagram of a relational database processing system suitable for application of the order detection by normalization (ODN) process of this invention.

FIG. 1 shows a functional block diagram of a computer-implemented database processing system 46 suitable for practicing the procedure of this invention. This exemplary configuration is described for illustrative purposes only and it can be appreciated that the process and system of this invention may be embodied within system 46 in many different useful fashions, including the arrangement depicted in FIG. 1. System 46 includes a central processing unit (CPU) 48, which is coupled to a parallel bus 50. The query input terminal 52 allows the user to enter queries into system 46, either from a remote terminal or through any other useful method known in the art. The data output terminal 54 displays the query results to the user and may be physically co-located with query input terminal 52.

System 46 includes the address space 56, which is shown schematically as containing program objects and data objects. The base table 58 is an example of a data object pulled into address space 56 from the external mass store 60 by way of bus 50. The view definition 52 is another data object representing a "virtual table" made up of elements from one or more base tables in accordance with a VIEW definition statement. External mass store 60 includes a generally large plurality of base tables (also denominated base relations), exemplified by base tables 64 and 66. These base tables are moved partially or entirely between memory space 56 and external mass store 60 in a manner well-known in the art for database management systems.

Address space 56 also includes the control program object 68, which manages the other components of system 46. These components include a query parser 70 for accepting the query input from terminal 52 and constructing an internal representation of the query. A query optimizer 74 receives the internal representation of the user query and generates, in a bottom-up fashion, all feasible query execution plans (QEPs). Query optimizer 74 then determines a "cost" (which is an estimate of the CPU and I/O resources that are consumed during execution of a plan) for each plan based on data statistics, configuration parameters and the query itself. Optimizer 74 then chooses the plan having minimal cost as the "optimal" query execution plan. The order detection by normalization (ODN) process of this invention is embedded in query optimizer 74 to avoid unnecessary sorting operations during the construction of QEPs and, when sorting is unavoidable, to specify a minimal sorting criteria.

After identifying an "optimal" query execution plan, query optimizer 74 produces this plan as a program object, depicted as QEP 76 in address space 56. QEP 76 is finally executed with the assistance of control program 68 and the resulting relation is forwarded to data output display 54. Practitioners skilled in the art can appreciate that the description of system 46 in FIG. 1 is exemplary and the system and process of this invention, represented by query optimizer 74, may be incorporated in any RDBMS that uses a query optimization process.

Naive Order Detection Process

Figure 3:
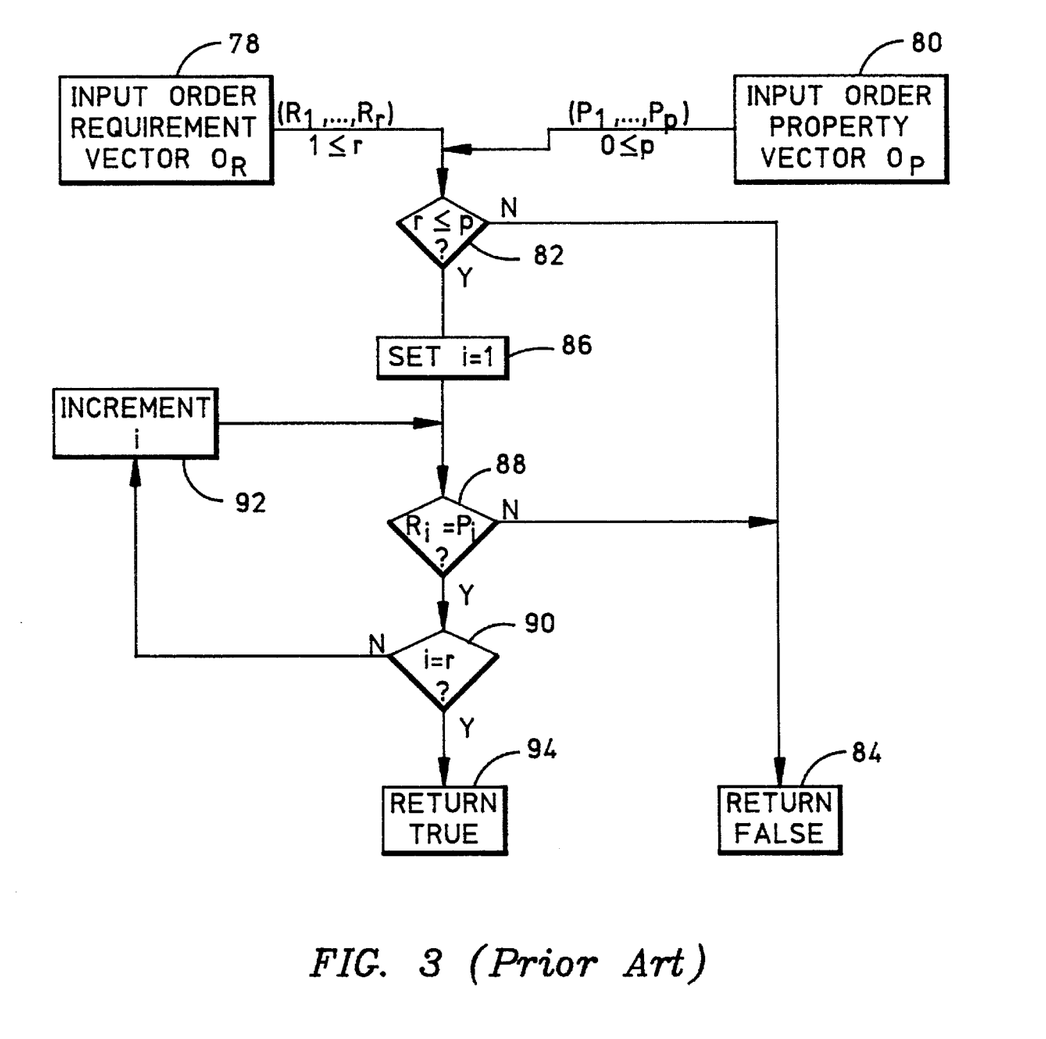
FIG. 3 is a functional block diagram of a flow chart embodying the naive order detection process from the prior art.

FIG. 3 provides a flow chart illustrating the naive order detection process known in the art. This process is straightforward because it simply checks whether the elements of the order requirement vector $O_R$ are a "prefix" of the order property vector $O_P$. If so, the process returns "true" to indicate that the order requirement is satisfied by the order property without any sorting operations.

In FIG. 3, the order requirement vector $O_R$ is introduced at step 78 as an ordered vector of attributes or columns ($R_1$, ..., $R_r$) where $r \geq 1$. If the order requirement vector $O_R$ is empty (r=0) then there is no order requirement and order detection is unnecessary. As mentioned above, the SQL92 standard provides that the vector $O_R$ requires the associated directed record stream to be first ordered according to the first attribute $R_1$, and, within that attribute, again ordered according to the second attribute $R_2$, and, within that attribute, again ordered according to the next-minor attribute, and so forth. Similarly, step 80 introduces the order property vector $O_P$ for the same directed record stream. Vector $O_P$ also includes a list of attributes or columns ($P_1$, ..., $P_p$) where $p \geq 0$. The order property vector $O_P$ may be empty (p=0) to signify no known ordering property within the directed record stream.

The exemplary naive order detection process embodiment in FIG. 3 first examines the two order specification vectors to ensure that $O_R$ is no larger than $O_P$ at step 82. That is, step 82 tests the length of $O_R$ against the length of $O_P$ and immediately proceeds to step 84 to return a "false" indication if the order requirement vector is too long to be a "prefix" of the order property vector. If $O_R$ is short enough to fit within $O_P$, then the procedure initiates an i-loop at step 86 to compare each attribute in sequence at step 88. Upon any finding that $R_i \neq P_i$, step 88 immediately exits to step 84 to return a "false" indication, demonstrating the detection of a sort requirement. So long as each element $R_i$ of the order requirement vector matches the corresponding element of $P_i$ of the order property vector, the loop recycles at steps 90 and 92. When all elements of $O_R$ have been tested, step 90 proceeds to step 94 to return a "true" indication, showing that no sorting requirement exists for the particular directed record stream under test. Importantly, the naive order detection process of FIG. 3 looks only at the order requirement and order property of the record stream and does not consider the effects of other properties. Consequently, the procedure cannot correctly anticipate the effects of predicates and functional dependencies when detecting sorting requirements. This deficiency in the art introduces many unnecessary "false" returns to step 84.

Order Detection by Normalization

The concept of "column equivalence" or attribute equivalence is important for implementing the order detection by normalization (ODN) process of this invention. When a predicate equates two columns (e.g., EMPNO=DEPTNO), for instance, it creates an "equivalence class". An equivalence class herein denominates a set of columns made equivalent through the application of equality predicates. Two columns or attributes can be made equivalent by a single predicate equating the two columns or by transitivity among two or more equality predicates. For a given equivalence class, one attribute may be arbitrarily chosen as an "equivalence class head". For the purposes of this disclosure, every attribute belongs to an "equivalence class" and some equivalence classes have only a single member, which is of course the "head" of its single-member equivalence class. This recognizes that each attribute is equivalent to itself. In equivalence classes having more than one member, the "equivalence class head" member is arbitrarily designated such that no equivalence class has more than one "head" attribute member. It is assumed for the purposes of this disclosure that, given a set of applied predicates, means exist to determine whether some column $C_i$ belongs to the same equivalence class as some other column $C_j$ and means are assumed to exist for determining the equivalence class head for an arbitrary column C.

As discussed above, the order detection process also must know when a column or attribute has a constant value. A column C is herein said to be "bound" in a record stream if C has the same value for every record in the stream. A column C can be bound in several ways. For instance, C may be derived from a constant expression. As an example, the derived column VC1 defined by the view CREATE VIEW V1 (VC1, VC2) AS SELECT 'name', lastname FROM EMPLOYEE, is derived from a constant expression. A column may also be bound through application of a predicate. As an example, rows qualifying after application of the predicate C=1,000*0.001 have column C bound. A column in the equivalence class to which C belongs may become bound through the operation of some predicate or by some other action.

A column C may also become bound in a context-dependent manner. For example, if $C_i = C_j$ where $C_j$ is a "correlated" column, then $C_i$ is "bound" in the context where $C_j$ is correlated. Finally, column C may be functionally dependent on a set of other columns which themselves become bound through some referential mechanism. For the purposes of this disclosure, it is assumed that, given a set of applied predicates, means exist to determine whether a column C in a directed record stream is bound.

Figure 4:
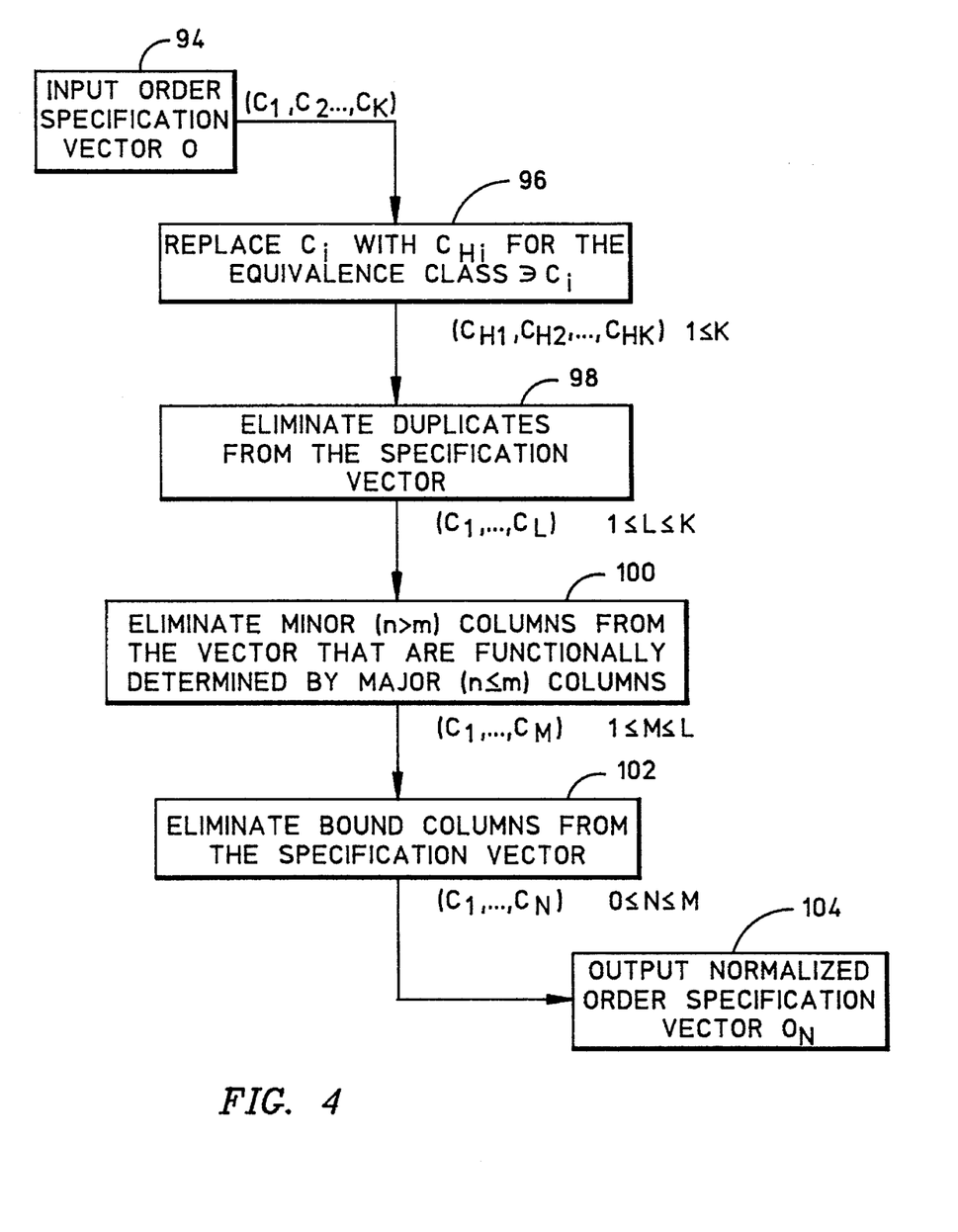
FIG. 4 is a functional block diagram of a flow chart showing the preferred embodiment of the order specification normalization process of this invention.

FIG. 4 provides a flow chart illustrating the preferred embodiment of the ODN process of this invention. The fundamental purpose of the ODN process is to reduce both the order requirement vector and the order property vector to a canonical form before comparison. That is, both order specifications are "normalized" by removing all attributes that are redundant to the order detection process. Each attribute in both order specification vectors is somehow examined to determine whether it is affected by known predicate relationships and functional dependencies. Once the specifications are normalized, the naive order detection procedure discussed above in connection with FIG. 3 is then used to compare the normalized order specifications.

In FIG. 4, the order specification vector O (either property or requirement) is introduced at step 94. The vector O is assumed to include K attributes, where $K \geq 1$. The ODN process includes the four steps shown in FIG. 4 as steps 96, 98, 100 and 102. The normalized specification resulting from each step is equivalent to the original specification vector O in the sense that records ordered with respect to the resulting order specification are also ordered with respect to O. Although the steps 96, 98, 100 and 102 can be applied in the order shown in FIG. 4, these steps may also be applied in any order and may be applied repeatedly until no progress is made. Thus, while shown in a sequence in FIG. 4, the four normalization steps should be considered as axiomatic rather than algorithmic in nature.

Referring to FIG. 4, in step 96, each attribute $C_i$ contained in specification vector O is replaced with the head attribute $C_{Hi}$ for the equivalence class that includes the attribute $C_i$. This step 96 can be expressed simply as "substitute each column with its arbitrarily-selected equivalence class head". Of course, where a column has no equivalences, it is merely replaced by itself in this step. The resulting normalized vector ($C_{H1}$, $C_{H2}$, ..., $C_{HK}$) also has K elements. Records ordered with respect to this normalized vector are also ordered with respect to the original vector O because all columns in the same equivalence class are equivalent by definition.

In step 98, all minor duplicate attributes or columns are eliminated ("squeezed") from the specification vector. Only the most major duplicate column element is retained. This step 98 in combination with step 96 serves to eliminate equivalent columns from the specification vector. The normalized vector resulting from step 98 includes the columns ($C_1$, ..., $C_L$) where $1 \leq L \leq K$. The vector cannot include less than one column because the original specification vector O had at least one column. However, the remaining L attributes in the normalized vector may be less in number than the original K attributes in specification vector O.

In step 100, all "functionally-dependent" columns are squeezed or eliminated from the specification vector wherever the functionally-dependent column is in a more minor position than the one or more columns by which it is determined. That is, if $\overline{C}=\{C_1, C_2, \ldots C_m\}$ and if there exists a functional dependency $\overline{C} \to C_n$, where $n \leq m$, and the columns in $\overline{C}$ are a subset of the columns in the specification vector, then column $C_n$ is eliminated from the specification vector. In determining whether $\overline{C} \to C_n$, some examination of predicates and functional dependencies is required. For example, if $\{C_1, C_2, C_4\} \to C_7$ and the predicates $C_2=2$, $C_3=C_4$ and $C_5=C_7$ have been applied to the record stream, then it is necessary to conclude that $\{C_1, C_3\} \to C_5$. Thus, the concept of normalization may require an analysis of functional dependencies but a detailed discussion of this concept is unnecessary for the purposes of this disclosure.

The equivalence in the order specification vectors before and after eliminating minor columns that are functionally determined by a major column can be appreciated by considering that when two records $t_1$ and $t_2$ are compared, the value of attribute $C_n$ affects their order only when $t_1$ and $t_2$ have the same values in columns $C_1, C_2, \ldots, C_m, C_{n-1}$. But $t_1.C_n$ and $t_2.C_n$ must also have the same value in that case because $\overline{C} \to C_n$. Consequently, squeezing $C_n$ from the order specification does not change the resulting order of the records, thereby demonstrating that records ordered with respect to the normalized order specification vector are also ordered with respect to the original order specification vector.

Returning to FIG. 4, step 102 eliminates (squeezes) all bound columns from the specification vector. A column B may become bound indirectly through functional dependencies. For example, if $\{C_1, C_2\} \to B$ and both $C_1$, $C_2$ are bound, then B is bound as well. For the purposes of this disclosure, it is assumed that means exist for determining which order specification attributes are bound. Because a bound column has the same value for every record, squeezing bound columns from the order specification has no effect on the ordering in the record stream.

After completing the four normalizing steps, the normalized order specification vector $O_N$ is produced at the step 104 in FIG. 4. The normalized specification vector $O_N$ may be reintroduced at step 94 if desired and the normalizing steps repeated iteratively until no further changes are noted.

The four steps 96, 98, 100, and 102 (FIG. 4) are now illustrated by the following example:

SELECT E.EMPNO, E.NAME, D.DEPTNO, D.SIZE
FROM EMP E, DEPT D
WHERE E.DEPTNO=D.DEPTNO
AND D.SIZE=100
ORDER BY 1,2,3,4;

Assume that EMPNO is the key for the EMP relation. In this case, the query compiler must satisfy the order requirement (E.EMPNO, E.NAME, D.DEPTNO, D.SIZE). By step 96, D.DEPTNO can be replaced by E.DEPTNO to provide the normalized specification vector (E.EMPNO, E.NAME, E.DEPTNO, D.SIZE). Because E.EMPNO is a key, it functionally determines both E.NAME and E.DEPTNO. That is, E.EMPNO→E.NAME and E.EMPNO→E.DEPTNO. Thus, using step 100 (FIG. 4), the order specification vector can be further normalized to produce (E.EMPNO, D.SIZE). Finally, using step 102, the order specification vector is reduced yet again to yield (E.EMPNO) because the value of D.SIZE is bound by the predicate D.SIZE=100. Accordingly, if an index on EMPNO is used at the outer access for either a nested-loop or sort-merge join operation, for instance, then no additional sort is necessary to satisfy the ORDER BY clause because the "order property" of the index (E.EMPNO) satisfies the normalized "order requirement" of (E.EMPNO).

Note that, in this example, D.DEPTNO may not be replaced by E.DEPTNO in the order requirement vector until the predicate E.DEPTNO=D.DEPTNO has been applied. This illustrates that, in general, each normalization step in the ODN process of this invention is context-sensitive, depending on the "property vector" associated with the particular directed record stream undergoing order detection.

The complete ODN process of this invention is now described in connection with the flow chart shown in FIG. 5 and the pseudocode embodiment provided in Table 1 below.

TABLE 1 normalize OP to form NOP
normalize OR to form NOR
if (there are no columns in NOR)
{
    all columns with respect to OR are bound and OR is trivially satisfied
}
else if (there are no columns in NOP)
{
    OP does not satisfy OR
}
else
{
    apply the naive order detection algorithm to NOR and NOP
}

Figure 5:
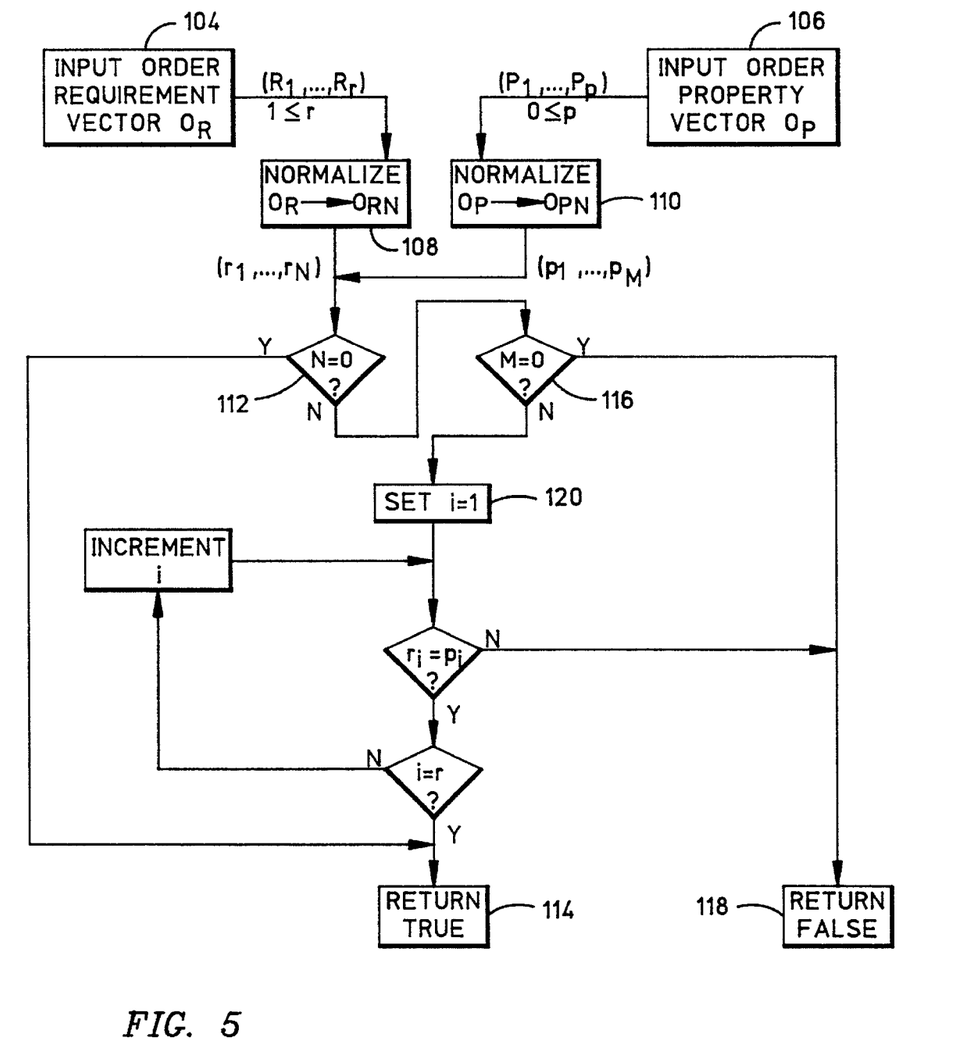
FIG. 5 is a functional block diagram of a flow chart showing a preferred embodiment of the order detection by normalization (ODN) process of this invention.

In FIG. 5, the order requirement vector $O_R$ is produced at step 104 and the order property vector $O_P$ is produced at step 106. At step 108, the order requirement vector $O_R$ is normalized by the process shown in FIG. 4 to produce the normalized order requirement vector $O_{RN}$. Similarly, at step 110, the order property vector $O_P$ is normalized to produce the normalized order property vector $O_{PN}$. At step 112, the normalized order requirement vector $O_{RN}$ is tested to determine whether any attributes remain in the vector. If step 112 finds the normalized order requirement vector to be empty, then step 114 immediately returns a "true" indicating no sorting requirement. If step 112 finds attributes in the normalized order requirement vector, then step 116 tests the normalized order property vector $O_{PN}$ for emptiness. If $O_{PN}$ has no attributes, then step 118 immediately returns a "false" indication showing detection of an unavoidable sorting operation because the empty normalized property vector cannot possibly satisfy the non-empty normalized order requirement vector.

If both normalized order specification vectors are non-empty, then step 120 initiates the naive order detection loop that compares the two specification vectors, column by column, as discussed above in connection with FIG. 3.

The order specification normalization procedure of this invention may also be used to determine an optimal sort order when a sorting operation is unavoidable. When performing a sort, it is important to minimize the number of sorting columns to reduce the "cost" of the sorting operation. If OR denotes the order requirement vector and NOR denotes the normalized order requirement vector, then Table 2 below provides a pseudocode embodiment of a useful procedure for determining an optimal sort order.

TABLE 2

```
normalize OR to form NOR
if (there are no columns in NOR)
{
    all columns with respect to OR are bound and there is no
    need to sort
}
else
{
    sort on NOR
}
```

Compared to the order detection procedures known in the art, the ODN process of this invention is more cognizant of properties such as functional dependencies and applied predicates. Because of this, the ODN process more often detects situations where sorting operations can be avoided. The normalization process described above in connection with FIG. 4 may also be used to determine the minimum number of sorting columns when a sorting operation is unavoidable. In practice, the inventors have found that query execution plans produced using the ODN process of this invention can execute orders of magnitude faster than those produced without it.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for order detection during processing of a query in a relational database processing system having a stored database including a plurality of base-relations {T} and a data processor for processing queries represented by query graphs {G}, wherein each said query graph G includes a plurality of relation nodes {$N_i$} each representing a relational operation associated with a record ordering requirement represented by an order requirement vector $O_{Ri}$, wherein each said relation node $N_i$ is connected to at least one other said relation node $N_j$ by a directed record stream $R_{ij}$ representing a record stream output from said each relation node $N_i$ and a record stream input to said other relation node $N_j$ ordered according to an order property vector $O_{Pi}$, wherein i and j are positive integers, said method comprising the steps of:

(a) normalizing said order property vector $O_{Pi}$ to produce a normalized order property vector $O_{PNi}$ for said input record stream $R_{ji}$ of a first said relation node $N_j$;

(b) normalizing said order requirement vector $O_{Ri}$ to produce a normalized order requirement vector $O_{RNi}$ for said first relation node $N_j$; and (c) comparing said normalized order requirement vector $O_{RNi}$ to said normalized order property vector $O_{PNi}$ to detect an ordering requirement for said first relation node $N_j$.

2. The method of claim 1 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said relation attributes each belong to a class of equivalent attributes including a head attribute, $0 \leq p, r$ are non-negative integers and wherein said normalizing steps (a) and (b) comprise the steps of:

(a.1) replacing in said order property vector $O_{Pi}$ each said relation attribute $P_p$ in said first ordered list with the head attribute $P_{Hp}$ from said equivalence class containing said each relation attribute $P_p$;

(a.2) eliminating relation attribute duplicates from said first ordered list in said order property vector $O_{Pi}$;

(b.1) replacing in said order requirement vector $O_{Ri}$ each said relation attribute $R_r$ in said second ordered list with the head attribute $R_{Hr}$ from said equivalence class containing said each relation attribute $R_r$; and (b.2) eliminating relation attribute duplicates from said second ordered list in said order requirement vector $O_{Pi}$.

3. The method of claim 2 wherein said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, $1 \leq k \leq j$ are positive integers and wherein said normalizing steps (a) and (b) further comprise the steps of:

(a.3) eliminating each said functionally-dependent relation attribute $P_j$ from said order property vector $O_{Pi}$; and (b.3) eliminating each said functionally-dependent relation attribute $R_j$ from said order requirement vector $O_{Ri}$.

4. The method of claim 3 wherein said order property vector $O_{Pi}$ or said order requirement vector $O_{Ri}$ includes at least one bound relation attribute that has the same value for every record in said input record stream $R_{ji}$ and wherein said normalizing steps (a) and (b) further comprise the steps of:

(a.4) eliminating each said bound relation attribute from said order property vector $O_{Pi}$; and (b.4) eliminating each said bound relation attribute from said order requirement vector $O_{Ri}$.

5. The method of claim 1 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, said relation attributes each belong to a class of equivalent attributes including a head attribute, $1 \leq k \leq j$ are positive integers, $0 \leq p, r$ are non-negative integers and wherein said normalizing steps (a) and (b) comprise the steps of:

(a.1) eliminating each said functionally-dependent relation attribute $P_j$ from said order property vector $O_{Pi}$; and (b.1) eliminating each said functionally-dependent relation attribute $R_j$ from said order requirement vector $O_{Ri}$.

6. A query compiler system in a relational database processing system comprising:

a data processor for processing queries represented by query graphs {G}, wherein each said query graph G includes a plurality of relation nodes $\{N_i\}$ each representing a relational operation associated with a record ordering requirement represented by an order requirement vector $O_{Ri}$, wherein each said relation node $N_i$ is connected to at least one other said relation node $N_j$ by a directed record stream $R_{ij}$ representing a record stream output from said each relation node $N_i$ and a record stream input to said other relation node $N_j$ ordered according to an order property vector $O_{Pi}$, wherein i and j are positive integers;

normalizing means in said data processor for normalizing said order property vector $O_{Pi}$ to produce a normalized order property vector $O_{PNi}$ for said input record stream $P_{ji}$ of a first said relation node $N_i$ and for normalizing said order requirement vector $O_{Ri}$ to produce a normalized order requirement vector $O_{RNi}$ for said first relation node $N_i$; and order detection means coupled to said normalizing means for comparing said normalized order requirement vector $O_{RNi}$ to said normalized order property vector $O_{PNi}$ to detect an ordering requirement for said first relation node $N_i$.

7. The system of claim 6 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said relation attributes each belong to a class of equivalent attributes including a head attribute, $0 \leq p, r$ are non-negative integers and wherein said normalizing means comprises:

equivalence substitution means for replacing in said order property vector $O_{Pi}$ each said relation attribute $P_p$ in said first ordered list with the head attribute $P_{Hp}$ from said equivalence class containing said each relation attribute $P_p$ and for replacing in said order requirement vector $O_{Ri}$ each said relation attribute $R_r$ in said second ordered list with the head attribute $R_{Hr}$ from said equivalence class containing said each relation attribute $R_r$; and duplicates squeezing means for eliminating relation attribute duplicates from said first ordered list in said order property vector $O_{Pi}$ and for eliminating relation attribute duplicates from said second ordered list in said order requirement vector $O_{Pi}$.

8. The system of claim 7 wherein said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, $1 \leq k < j$ are positive integers and wherein said normalizing means further comprises:

functional-dependencies squeezing means for eliminating each said functionally-dependent relation attribute $P_j$ from said order property vector $O_{Pi}$ and for eliminating each said functionally-dependent relation attribute $R_j$ from said order requirement vector $O_{Ri}$.

9. The system of claim 8 wherein said order property vector $O_{Pi}$ or said order requirement vector $O_{Ri}$ includes at least one bound relation attribute that has the same value for every record in said input record stream $R_{ji}$ and wherein said normalizing means further comprises:

redundancies squeezing means for eliminating each said bound relation attribute from said order property vector $O_{Pi}$ and for eliminating each said bound relation attribute from said order requirement vector $O_{Ri}$.

10. The system of claim 6 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, said relation attributes each belong to a class of equivalent attributes including a head attribute, $1 \leq k < j$ are positive integers, $0 \leq p, r$ are non-negative integers and wherein said normalizing means comprises:

functional-dependencies squeezing means for eliminating each said functionally-dependent relation attribute $P_j$ from said order property vector $O_{Pi}$ and for eliminating each said functionally-dependent relation attribute $R_j$ from said order requirement vector $O_{Ri}$.

11. A database processing system comprising:

a stored database including a plurality of base-relations $\{T\}$;

a data processor for processing queries represented by query graphs $\{G\}$, wherein each said query graph G includes a plurality of relation nodes $\{N_i\}$ each representing a relational operation associated with a record ordering requirement represented by an order requirement vector $O_{Ri}$, wherein each said relation node $N_i$ is connected to at least one other said relation node $N_j$ by a directed record stream $R_{ij}$ representing a record stream output from said each relation node $N_i$ and a record stream input to said other relation node $N_j$ ordered according to an order property vector $O_{Pi}$, wherein i and j are positive integers;

normalizing means in said data processor for normalizing said order property vector $O_{Pi}$ to produce a normalized order property vector $O_{PNi}$ for said input record stream $R_{ji}$ of a first said relation node $N_i$ and for normalizing said order requirement vector $O_{Ri}$ to produce a normalized order requirement vector $O_{RNi}$ for said first relation node $N_i$; and order detection means coupled to said normalizing means for comparing said normalized order requirement vector $O_{RNi}$ to said normalized order property vector $O_{PNi}$ to detect an ordering requirement for said first relation node $N_i$.

12. The system of claim 11 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said relation attributes each belong to a class of equivalent attributes including a head attribute, $0 \leq p, r$ are non-negative integers and wherein said normalizing means comprises:

equivalence substitution means for replacing in said order property vector $O_{Pi}$ each said relation attribute $P_p$ in said first ordered list with the head attribute $P_{Hp}$ from said equivalence class containing said each relation attribute $P_p$ and for replacing in said order requirement vector $O_{Ri}$ each said relation attribute $R_r$ in said second ordered list with the head attribute $R_{Hr}$ from said equivalence class containing said each relation attribute $R_r$; and duplicates squeezing means for eliminating relation attribute duplicates from said first ordered list in said order property vector $O_{Pi}$ and for eliminating relation attribute duplicates from said second ordered list in said order requirement vector $O_{Ri}$.

13. The system of claim 12 wherein said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, $1 \leq k < j$ are positive integers and wherein said normalizing means further comprises:

functional-dependencies squeezing means for eliminating each said functionally-dependent relation attribute $P_j$ from said order property vector $O_{Pi}$ and for eliminating each said functionally-dependent relation attribute $R_j$ from said order requirement vector $O_{Ri}$.

14. The system of claim 13 wherein said order property vector $O_{Pi}$ or said order requirement vector $O_{Ri}$ includes at least one bound relation attribute that has the same value for every record in said input record stream $R_{ji}$ and wherein said normalizing means further comprises:

redundancies squeezing means for eliminating each said bound relation attribute from said order property vector $O_{Pi}$ and for eliminating each said bound relation attribute from said order requirement vector $O_{Ri}$.

15. The system of claim 11 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, said relation attributes each belong to a class of equivalent attributes including a head attribute, $1 \leq k < j$ are positive integers, $0 \leq p$, r are non-negative integers and wherein said normalizing means comprises:

functional-dependencies squeezing means for eliminating each said functionally-dependent relation attribute $P_j$ from said order property vector $O_{Pi}$ and for eliminating each said functionally-dependent relation attribute $R_j$ from said order requirement vector $O_{Ri}$.

16. A computer program product, for use with a relational database processing system having a stored database including a plurality of base-relations $\{T\}$ and a data processor for processing queries represented by query graphs $\{G\}$, wherein each said query graph G includes a plurality of relation nodes $\{N_i\}$ each representing a relational operation associated with a record ordering requirement represented by an order requirement vector $O_{Ri}$, wherein each said relation node $N_i$ is connected to at least one other said relation node $N_j$ by a directed record stream $R_{ij}$ representing a record stream output from said each relation node $N_i$ and a record stream input to said other relation node $N_j$ ordered according to an order property vector $O_{Pi}$, wherein i and j are positive integers, said computer program product comprising:

a recording medium;

means, recorded on said recording medium, for directing said data processor to normalize said order property vector $O_{Pi}$ to produce a normalized order property vector $O_{PNi}$ for said input record stream $R_{ji}$ of a first said relation node $N_i$;

means, recorded on said recording medium, for directing said data processor to normalize said order requirement vector $O_{Ri}$ to produce a normalized order requirement vector $O_{RNi}$ for said first relation node $N_i$; and means, recorded on said recording medium, for directing said data processor to compare said normalized order requirement vector $O_{RNi}$ to said normalized order property vector $O_{PNi}$ to detect an ordering requirement for said first relation node $N_i$.

17. The computer program product of claim 16 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said relation attributes each belong to a class of equivalent attributes including a head attribute and wherein $0 \leq p$, r are non-negative integers, said computer program product further comprising:

means, recorded on said recording medium, for directing said data processor to replace in said order property vector $O_{Pi}$ each said relation attribute $P_p$ in said first ordered list with the head attribute $P_{Hp}$ from said equivalence class containing said each relation attribute $P_p$;

means, recorded on said recording medium, for directing said data processor to eliminate relation attribute duplicates from said first ordered list in said order property vector $O_{Pi}$;

means, recorded on said recording medium, for directing said data processor to replace in said order requirement vector $O_{Ri}$ each said relation attribute $R_r$ in said second ordered list with the head attribute $R_{Hr}$ from said equivalence class containing said each relation attribute $R_r$; and means, recorded on said recording medium, for directing said data processor to eliminate relation attribute duplicates from said second ordered list in said order requirement vector $O_{Pi}$.

18. The computer program product of claim 17 wherein said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list and wherein $1 \leq k < j$ are positive integers, said computer program product further comprising:

means, recorded on said recording medium, for directing said data processor to eliminate each said functionally-dependent relation attribute $P_j$ from said order property vector $O_{Pi}$; and means, recorded on said recording medium, for directing said data processor to eliminate each said functionally-dependent relation attribute $R_j$ from said order requirement vector $O_{Ri}$.

19. The computer program product of claim 18 wherein said order property vector $O_{Pi}$ or said order requirement vector $O_{Ri}$ includes at least one bound relation attribute that has the same value for every record in said input record stream $R_{ji}$, said computer program product further comprising:

means, recorded on said recording medium, for directing said data processor to eliminate each said bound relation attribute from said order property vector $O_{Pi}$; and means, recorded on said recording medium, for directing said data processor to eliminate each said bound relation attribute from said order requirement vector $O_{Ri}$.

20. The computer program product of claim 16 wherein said order property vector $O_{Pi}$ includes a first ordered list of relation attributes $(P_1, \ldots, P_p)$, said order requirement vector $O_{Ri}$ includes a second ordered list of relation attributes $(R_1, \ldots, R_r)$, said order property vector $O_{Pi}$ includes at least one functionally-dependent relation attribute $P_j$ that is fully determined by one or more said relational attributes $\{P_k\}$ ordered ahead of said functionally-dependent relation attribute $P_j$ in said first ordered list or said order requirement vector $O_{Ri}$ includes at least one functionally-dependent relation attribute $R_j$ that is fully determined by one or more said relational attributes $\{R_k\}$ ordered ahead of said functionally-dependent relation attribute $R_j$ in said second ordered list, said relation attributes each belong to a class of equivalent attributes including a head attribute, $1 \leq k < j$ are positive integers and wherein $0 \leq p$, r are non-negative integers, said computer program product comprising:

means, recorded on said recording medium, for directing said data processor to eliminate each said functionally-dependent relation attribute $P_j$ from said order property vector $O_{Pi}$; and means, recorded on said recording medium, for directing said data processor to eliminate each said functionally-dependent relation attribute $R_j$ from said order requirement vector $O_{Ri}$.

* * * * *